May 6, 1958 H. E. BACHER ET AL 2,833,567
FITTING FOR REINFORCED HOSE WITH SEAL MAINTAINING MEANS
Filed Oct. 11, 1955 2 Sheets-Sheet 1
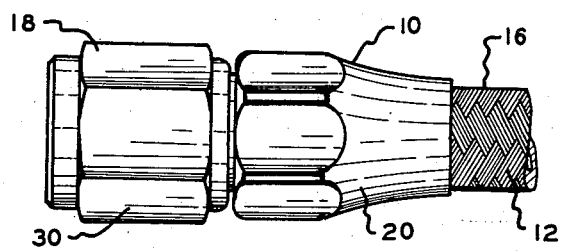
FIG. I.
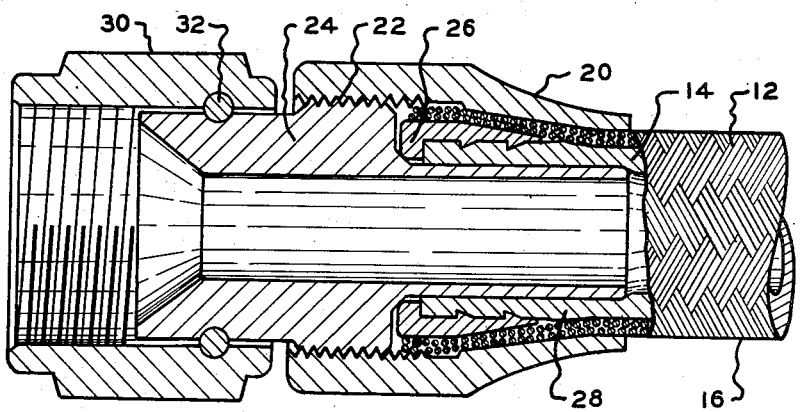
FIG. II.
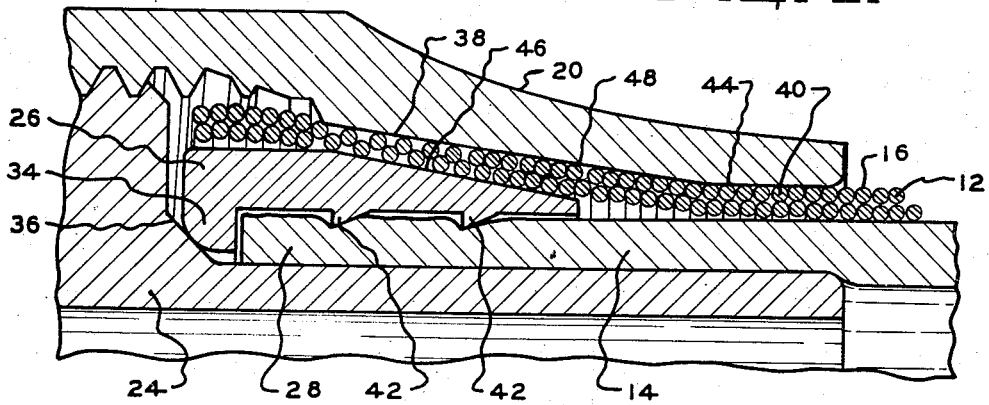
FIG. III.
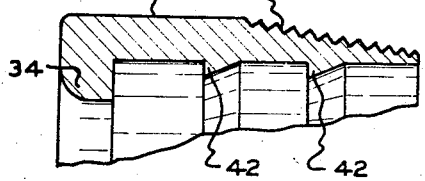
FIG. IV.
INVENTOR
HANS E. BACHER
and ROGER R. LAMARRE
BY *Townsend & Beaman*
ATTORNEY May 6, 1958 H. E. BACHER ET AL 2,833,567
FITTING FOR REINFORCED HOSE WITH SEAL MAINTAINING MEANS
Filed Oct. 11, 1955 2 Sheets-Sheet 2
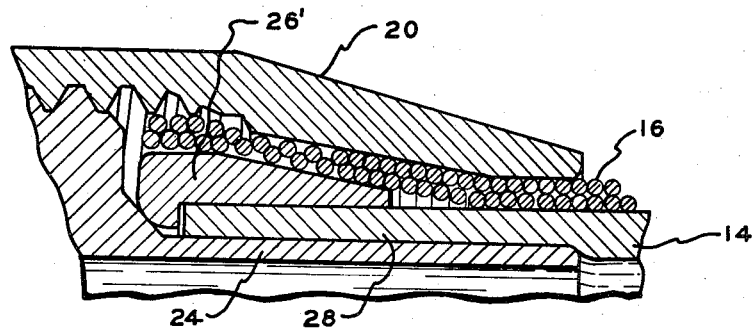
FIG. V.
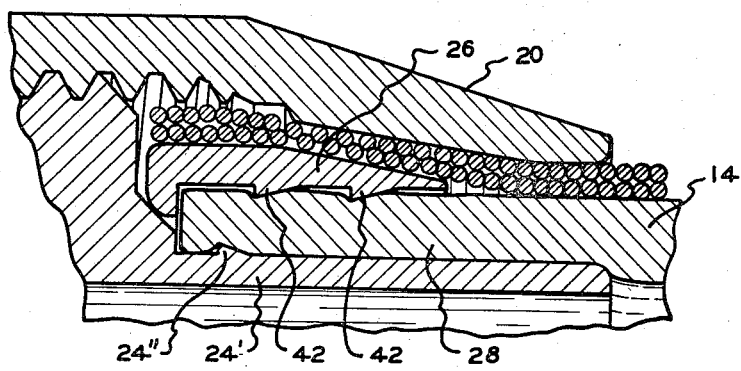
FIG. VI.
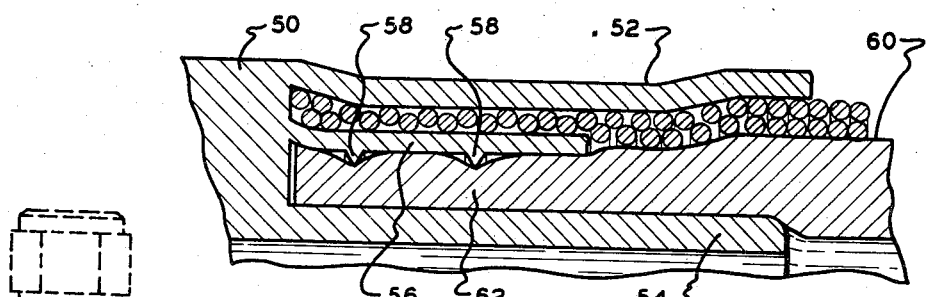
FIG. VII.
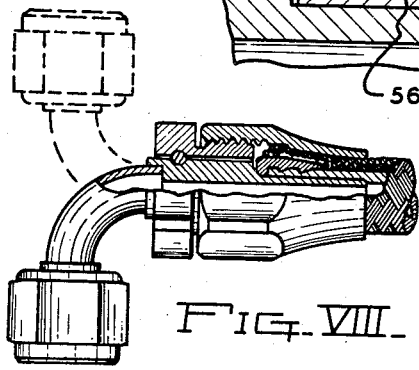
FIG. VIII.
INVENTOR.
HANS E. BACHER
and ROGER R. LAMARRE
BY
ATTORNEY

2,833,567

FITTING FOR REINFORCED HOSE WITH SEAL MAINTAINING MEANS

Hans Eugen Bacher and Roger R. La Marre, Jackson, Mich., assignors to Aeroquip Corporation, Jackson, Mich.

Application October 11, 1955, Serial No. 539,831

5 Claims. (Cl. 285—95)

The present invention relates to a method and to improvements in end fittings and the assembly thereof to hose construction for the fabrication of flexible hose lines of the general type in which the hose construction usually has an elastomer inner tube for retaining the fluid pressure and an outer reinforcing structure for supporting the inner tube against the internal pressures of the fluid. To provide a seal between the hose end and the fitting and at the same time to prevent axial displacement between the end fitting and the hose end, in one type of compression fitting the inner tube and the outer reinforcement of the inner tube is directly compressed as a unit between a nipple extending into the bore of the inner tube and a socket embracing the hose end. This form of end fitting is shown in United States Patent No. 2,219,266.

In another type of compression end fitting, as shown in United States Patent No. 2,463,293, an annular intermediate member is provided between the nipple, disposed in the bore of the inner tube, and the embracing socket; the intermediate member functioning to separate the inner tube from its reinforcement. With this form of construction after assembly deformation of the socket and intermediate member compresses the reinforcement between the socket and the intermediate member and at the same time the inner tube is compressed between the nipple and the intermediate member.

In the designing of end fittings for flexible hose lines, the fitting is considered to perform satisfactorily in service or upon testing if it is capable of forming a leak proof connection with the hose and have a performance capacity in excess of that of the hose itself inwardly from the fitting. Thus, a fitting which has performance capacity in excess of that of the hose to which it is attached with the result that failure of the hose precedes failure of the fitting, the fitting may be described as having "optimum performance capacity" with respect to the hose construction to which it is attached.

During the period the elastomer material from which the inner tube of the hose construction retains its original elasticity and degree of softness (hereinafter characterized as green) compression fittings of the above described types may be readily designed with optimum performance capacity. However, upon aging, especially under conditions of high or low temperatures maintained for extended periods, the original forces of compression between the fitting and the hose end will gradually diminish to the point that leakage will ultimately take place in the fitting well within performance capacity of the hose construction itself inwardly of the fitting. As disclosed in co-pending application Serial No. 184,813, filed September 14, 1950, now Patent No. 2,731,279, issued November 11, 1955, and as also shown in United States Patent No. 2,431,522, fitting structure has been proposed in which all forces of compression have been eliminated from a portion of the inner tube confined within the fitting and providing an annular lip seal portion. This annular lip seal portion is designed to be actuated by fluid pressure into pressure sealing relation with the annular wall of an intermediate member disposed between the nipple and the socket. In practice it has been found that the fitting construction of said co-pending application will have optimum performance capacity when used with a hose having an elastomer inner tube under most all conditions of use and aging with leakage occurring only in the event the annular lip seal portion hardens and/or stiffens to the extent that the available fluid pressure is inadequate to actuate the lip seal portion into fluid sealing position with respect to the embracing intermediate member.

For the same reason the fitting of said co-pending application may develop leakage upon appreciable hardening or stiffening of the elastomer material forming the annular lip seal portion, leakage may also be experienced under conditions of low pressure when this type of fitting is applied to a hose construction having an inner tube of plastomer material of sufficiently low elasticity and/or having a degree of stiffness which will prevent the development of fluid pressure sealing of the annular lip sealing portion. Inner tubes of polymerized tetrafluoroethylene, nylon, elastomers stiffened by compounding such as with synthetic resins and numerous thermoplastic tube stocks now available for use in flexible hose lines and herein defined as a group as plastomers necessitate a modification of the fitting structure of said co-pending application to achieve a fitting having optimum performance capacity.

According to the present invention we have provided an improved fitting over the type described in said co-pending application whereby the present invention is capable of giving optimum performance capacity with elastomer inner tube stock green or fully aged as well as with inner tube stock of relatively low elasticity, and/or of a relatively stiff or hard structure as compared with normal elastomer material. This has been accomplished in the present invention in detachable, reuseable fittings as well as permanently applied fittings, by so designing the structure embracing the annular lip seal portion as to position and maintain the lip seal portion in such contiguous relationship to the surface or surfaces against which it is actuated by the fluid pressure as to assure the development of an adequate initial seal whereby the fluid pressure carried by the inner tube is available for the actuation of the lip seal portion.

In one of the illustrated forms of the invention, the assembly and maintenance advantages of the detachable, reuseable, manually assembled type of fitting disclosed in said Patent No. 2,219,266 is accomplished through the provision of a sleeve which embraces the annular lip seal portion of the inner tube disposed upon the nipple of the fitting. More specifically, a detachable, reuseable fitting is shown in which a separate sleeve has a metal-to-metal seal with the nipple and embraces the annular lip seal portion of the inner tube; the interior surface of the sleeve having initial seal producing compressive engagement with the outer surface of the lip seal portion.

In another illustrated form, the principles of the invention, although particularly designed for detachable, reuseable fittings, is shown embodied into a permanently applied type of fitting of a swaged-on construction.

Thus, one object of the invention is to provide an improved fitting and hose assembly of the type having an annular lip seal portion in which a squeeze or compression takes place upon the lip seal of sufficient magnitude as to assure the actuation of the lip seal into sealing relationship with the embracing structure by a fluid pressure confined within the inner tube.

Another object is to provide an improved fitting and hose assembly of a modified compression type in which an annular lip seal portion is provided and so maintained with respect to the interior sealing surfaces of the embracing structure as to assure the development of adequate fluid pressure sealing with hose constructions having interior tube stock of both high and low elasticity and with the fitting having optimum performance capacity.

Another object is to provide an improved end fitting and hose assembly in which the terminal end of the hose inner tube defines an annular lip seal which is slightly compressed on initial assembly to provide such permanent contiguous relationship with regard to the embracing sealing surface as to assure adequate actuating pressure yet the lip seal remains relatively free from the high compressive forces developed in the final stages of assembly.

Another object is to provide an improved detachable, reuseable end fitting having optimum performance capacity when installed upon hose construction having reinforced inner tubes of elastomer as well as lower elasticity and/or harder plastomer materials, in which a separate sleeve embraces the annular lip seal portion of the inner tube, the sleeve having a metal-to-metal seal with the nipple and compressing the lip seal portion on initial assembly circumferentially at localized areas or area.

A further object is to provide an end fitting as described in the preceding object in which the sleeve functions to compress the hose reinforcement between a portion of the socket and the outer surface of the sleeve with the sleeve having the additional function because of its location and construction of protecting the lip seal portion from the compressive forces developed on final assembly.

A further object of the invention resides in the method of manipulation and embracement of the inner tube of the hose construction disposed within an end fitting as to enable the fitting to have optimum performance capacity when applied to hose construction having an inner tube of low elastic material such as polymerized tetrafluorethylene, nylon and similar materials.

A still further object is to provide a fitting in which the compressive forces existing between the nipple disposed in the bore and the inner tube stock of the hose construction is such as to permit convenient change of angularity of an extension of the nipple as for example an elbow extension.

A still further object of the invention is to provide an improved detachable reuseable fitting of the type described which has optimum performance capacity when used with hose construction having inner tubes of materials varying in elasticity over a very wide range and which comprises a nipple, a socket and an intermediate member separately formed from the nipple and socket and having a metal-to-metal seal with a portion of the nipple construction; the intermediate member being so designed as to assure an initial seal with respect to a lip seal portion defined by the inner tube of the hose construction and embraced by the intermediate member.

These and other objects and advantages residing in the present invention will more fully appear from the following specification and the appended claims.

In the drawings,

Fig. 1 is an elevational view of a flexible hose line assembly having a fitting applied to one end thereof embracing the principles of the present invention, Fig. 2 is an enlarged fragmentary view of Fig. 1 partly shown in cross section, Fig. 3 is an enlargement of a structural detail of Fig. 2, Fig. 4 is a cross sectional view of the intermediate sleeve removed from the assembly of Fig. 2, Figs. 5, 6 and 7 are views similar to Fig. 2 of modified forms of the invention, and Fig. 8 illustrates an advantage of the invention permitting convenient change in angularity of the nipple.

Referring to the illustrated form of the invention, the hose line assembly 10 comprises a flexible hose 12 having an inner tube 14 and a reinforcing structure for the tube in the form of braided wire 16. The end fitting 18 is of a detachable, reuseable type and comprises a socket 20 for threaded engagement at 22 with the nipple 24. A sealing sleeve 26 is shown embracing the terminal end of the inner tube 14 herein called the lip seal portion 28. A nut 30 is attached to the nipple 24 by a suitable connector 32.

While it is to be understood that the structural performance of the end fitting of the present invention has general application to flexible hose construction materials heretofore in wide use, it is especially adapted to the effective sealing of hose construction having an inner tube of relatively stiff and low elastic material, as for example, such materials as polymerized tetrafluoroethylene. Also it is to be understood that the sealing function and characteristics of the sleeve 26 are not restricted to detachable, reuseable fittings for the reason that the sleeve 26 may be used, for example, with nipple and socket structure of the swaged-on permanent type.

In view of the fact that the present invention resulted principally from an attempt to solve the problem of developing a satisfactory end fitting for wire braided hose having a polymerized tetrafluorethylene inner tube, the specific disclosure of the invention hereinafter appearing will be described with respect to the application of the invention to such a hose construction.

Accordingly, the hose 12 comprises an inner tube 14 of polymerized tetrafluoroethylene material which is furnished at the present time by the E. I. du Pont de Nemours and Company under the trademark "Teflon." Wire braid 16 is then applied to the inner tube 14 by the hose manufacturer to complete the fabrication of the hose structure. Because of the difficulties which have been experienced to date in providing a satisfactory bond between the "Teflon" inner tubing 14 and the wire braid 16, the reduction to practice of the present invention was carried out upon a hose 12 having the inner tube 14 unbonded to the wire braid 16. While this fact facilitates the insertion of the sealing sleeve 26 between the wire braid 16 and the outer surface of the inner tube 14, the bonding of the wire braid 16 to the inner tube 14 is anticipated and will only necessitate the destruction of the bonding at the locality of insertion of the sleeve 26.

The hose 12 in the assembly illustrated is first cut to length and is then inserted into the socket 20, the latter being slid inwardly from the cut end of the hose. Next the nipple 24 is inserted into the portion of the inner tube 14 to loosen the wire braid 16 adjacent the end of the hose 12 to facilitate the insertion of the sleeve 26. After loosening the wire braid 16 the nipple 24 is withdrawn from the bore of the inner tube 14 and the sleeve 26 is manually inserted between the wire braid 16 and the inner tube 14 to assume the position shown in Fig. 2. Thereafter the nipple 24 with the sleeve 26 embracing the end 28 is reinserted into the bore of the tube 14 and the socket 20 is slid along the hose 12 until threaded engagement can take place at 22 between the socket 20 and nipple 24 upon relative rotation.

After the nipple 24 is screwed into the socket 20, the forces developed by this assembly bring the rounded external annular shoulder 34 of the sleeve 26 into fluid sealing contact with the conical surface 36 of the nipple 24. At the same time, the wire braid 16 is wedged at 38 between the sleeve 26 and the socket 30 and firmly clamped. Compression of the hose 12 at 40 between the nipple 24 and the socket 20 will also take place upon assembly as just described for reasons hereinafter appearing.

With the inner tube 14 of a material relatively stiff and non-elastic as compared to the usual elastomeric inner tube stock of flexible hose lines, insufficient pressure is developed to provide an initial seal between the inner tube end 28 and the sleeve 26 unless some provision is made to obtain the necessary contiguous association between the fluid pressure actuated lip seal portion 28 and the inner surface of the embracing sleeve 26. At the same time it is desirous that this contiguous relationship between the sealing surfaces be obtained without sacrificing the advantages connected with a detachable, reuseable type of fitting which may be manually assembled without the use of special assembly tools. To this end in connection with the example being described, the outside diameter of the inner tube 14 is approximately .281", the inside diameter of the bore is approximately .187" and the outside of the nipple 24 is approximately .207". Thus the tube 14 will have its normal inside diameter of approximately .187" expanded an amount approximately .020" at the time the nipple 24 is manually inserted into the inner tube 14. The sleeve 26, where it embraces the terminal end 28 of the inner tube 14 has a main inside diameter of approximately .280" with the inside diameter of the annular sharp cornered ribs 42 approximating .268" which is in the order of .012" less than the expanded outer diameter of the inner tube 14. With existing manufacturing tolerances in practice, the amount of squeeze or compression exerted by the ribs 42 upon the tube 14 will be in the order of .008" to .013". This amount of squeeze permits the sleeve 26 to be manually applied to the end of the inner tube 20 and thereafter the manual insertion of the nipple 24 into the bore of the hose 12 may take place with the sleeve 26 embracing the inner tube 14 as shown in Fig. 3 and with the ribs 42 deforming the inner tube 14 as indicated. The relationship of the ribs 42 with reference to the material of the lip seal portion 28 is such as to prevent any appreciable flow of fluid between the ribs 42 and the deformed body of the inner tube and to an extent which enables the fluid pressure within the inner tube 14 and between the inner tube 14 and the outer surface of the nipple 24 to build up the necessary pressure along the inner surface of the tube 14 to force the annular sealing lip portion 28 embraced by the sleeve 26 into sealing relation with the inside wall of the sleeve 26. Under conditions of vacuum the lip seal portion 28 will seal along the outer surface of the nipple 24. In practice the inside diameter of the socket 20 at 44 will approximate the outside diameter of the wire braid 16 to produce at 44 a compression area to provide low pressure and vacuum sealing at this point.

It is also within the contemplation of the invention that in lieu of expanding the inner tube 14 by the nipple 24, the nipple 24 may have approximately the same outside diameter as the inside diameter of the inner tube 14. With this arrangement the inside diameter of the sleeve 26 will be proportionately reduced so as to reduce the diameter of the inner tube 14 at the time the sleeve 26 is inserted thereon with the result that the necessary compression required to perform the initial seal of the lip seal portion 28 within the sleeve 26 will be provided at the time the sleeve 26 is inserted into the inner tube 14 to expand the latter to its original inside diameter in the area embraced by the sleeve 26.

To prevent deformation of the sleeve 26 during the final assembly of the socket 20 on the nipple 24, the sleeve 26 has been provided with a long taper and the male taper of the sleeve 26 at 46 can be made greater than the female taper of the socket 20 at 48. This difference in taper also acts to force the shoulder 34 of the sleeve 26 into metal-to-metal sealing relation with the conical surface 36 of the nipple 24. Where the forces of assembly directed against the nipple 26 are sufficiently great to cause deformation of the conical surface 36 when the shoulder 34 of the sleeve 26 is rounded, it may become desirable to have the surface 34 more complementary to the surface 36 so as to distribute the loading of the metal-to-metal seal between the nipple 24 and the sleeve 26 over a greater area. Another detail of construction which may be used to advantage in some cases and especially where the wire braids 16 are of multiple layer, the outer tapered surface of the sleeve 26 may be knurled or otherwise irregular so as to increase the grip upon the wire braid between the sleeve 26 and the socket 20.

To appreciate the present invention it must be understood that the contiguous relationship between the lip seal portion 28 of the inner tube 14 and the inner surface of the sleeve 26 is that required only to provide an initial seal enabling the fluid pressure in the inner tube 14 and between the outer surface of the nipple 26 and the inner surface of the portion 28 to urge the portion 28 radially outward to actuate the outer wall of the portion 28 into fluid sealing relation with the inner wall of the sleeve 26 and to provide relatively high unit compression at the areas of the ribs 42 without sacrificing manual assembly. Two ribs 42 are shown because we feel that it is a preferred arrangement. However, a single rib 42 is capable of giving satisfactory performance depending upon the characteristics of the inner tube material.

It should also be understood in order to distinguish the present invention over that of Patent No. 2,463,293 that the amount of compression to which the lip seal portion 28 is subjected as a result of the initial assembly of the inner tube 14 with the sleeve 26 and nipple 24 is of a minor magnitude as compared to the compression developed in the final assembly of socket 20 upon the nipple 24 and to which the wire braid 16 is subjected. The sleeve 26 is constructed to protect the lip seal portion 28 from the high compression forces of final assembly in distinction to the disclosure of said patent. It is because of this fact that the nipple 26, upon loosening of the socket 20, may be readily rotated within the bore of the inner tube 14. After the initial assembly, the forces of assembly required to bring at least an annular portion of the lip seal portion 28 into contiguous relationship with at least an annular portion of the sleeve 26, need not be sustaining compressive forces. It is for this reason that the present invention makes it possible for the first time to provide an end fitting having optimum performance capacity with hose having an inner tube of deformable material of the class of elastomers and plastomers which are incapable of sustaining forces of compression of fluid sealing magnitude under pressures for which the assembly is designed under conditions of use and aging experienced in actual service.

A modification of the disclosure of Figs. 1 to 4 is shown in Fig. 5 wherein the ribs 42 of the sleeve 26 have been omitted. As shown, the sleeve 26' has a smooth inner wall. The necessary compression of the lip seal portion 28 has been accomplished by the expansion of the bore of the inner tube 14 at the time of insertion of the nipple 24 and before the socket 20 has complete assembly with the nipple 24 to develop the compressive forces of final assembly in the fitting.

The form of the invention of Fig. 6 is as described with reference to Figs. 1 to 4 except the nipple 24 has been slightly modified. As illustrated the nipple 24' has a rib 24" corresponding to the ribs 42. This is to assure sealing under vacuum and may be found necessary with some inner tube stocks.

In Fig. 7 is shown one feature of the present invention applied to a deformed compression fitting of the type shown in Patent No. 2,463,293. The fitting 50 has a socket portion 52, a nipple portion 54 and an intermediate sleeve portion 56 provided with annular ribs 58 along its inner surface to deform the inner tube 60 along circumferentially disposed areas to enable the portion 62 to function as a lip seal with plastomer inner tube materials. It will be appreciated that the construction of Fig. 7 is incapable of manual assembly and thus does not possess the principal feature of the present invention resulting from the use of the separately fabricated and applied sleeve 26 of Figs. 1 to 4, inclusive, on a detachable, reusable type of fitting.

Fig. 8 illustrates the manner in which an elbow extension 64 of the nipple 24 of Figs. 1 to 4, inclusive, may have its angularity adjusted by slightly rotating the socket 20 to relieve the pressure of the metal-to-metal between the inpple 24 and socket 20. Thereafter, the nipple 24 may be readily rotated by hand to locate the position of the elbow as desired. The ability to so manipulate the nipple 24 results from the fact that the compressive forces upon the nipple resulting from initial assembly are of small magnitude and that sealing of the inner tube within the fitting is dependent upon actuation of the lip seal portion by fluid pressure.

Having thus described our invention, what we claim as new and patentable is:

1. The combination with a flexible hose having an inner tube of substantially uniform wall thickness and an outer tubular reinforcement, the material of said inner tube being characterized by being of the class of elastomers and plastomers which either harden and stiffen upon aging in hose line service or as in the case of polymerized tetrafluoroethylene have low elasticity and a relatively high degree of stiffness before being placed in service, of a detachable, reusable end fitting for said hose of the type in which the sealing against leakage is performed by a fluid actuated flexible lip and axial separation of the hose and fitting is prevented by the attachment between the fitting and the hose reinforcement, said fitting comprising a sealing sleeve having an outer surface for expanding said reinforcement independently of said tube upon insertion of said sleeve between said reinforcement and said tube, said sleeve having an axial bore to receive said tube therein with a relatively snug fit, said sleeve at the inner leading end of said sleeve tapering from adjacent the tube entrance end of said bore to provide a thin edged annular nose to facilitate the entrance of said sleeve between said reinforcement and said tube and to expand and support said reinforcement along said outer surface, a nipple having a substantially cylindrical portion of substantially uniform diameter inserted into said inner tube, said inserted nipple portion in axial extent exceeding the inserted axial length of said tube in said sleeve to dispose the entering end of said nipple inwardly beyond the nose of said sleeve to give support to said tube beyond its inserted length within said sleeve, the portion of said bore in the locality of the inserted axial length of said tube being substantially cylindrical and of substantial uniform diameter from the tube entrance end, said nipple being disposed substantially concentric within said sleeve to define with said cylindrical portion of said bore an annular cavity substantially corresponding in radial and axial dimensions to the original wall thickness and the inserted length of said tube whereby said tube substantially fills said cavity, at least one of said concentric parts having a radial wall portion to define one end of said cavity and to locate the terminal portion of the said tube within said sleeve, at least one annular rib of generally saw tooth form defined as a radial projection on the inner cylindrical surface of said bore of said sleeve with the leading side of said rib sloping to facilitate the insertion of said tube within said bore from said entrance end, said rib being located within the axial limits of said cavity, the axial extent of said cavity and the inserted tube length therein being at least twice the wall thickness of said tube with said rib being located at least the wall thickness of said tube from said radial wall portion the axial spacing of each said rib, along said cylindrical bore, with respect to any other such rib and to each end of said cavity being at least as great as the wall thickness of said tube to provide a flexible lip portion of tube of substantial axial length between said radial wall portion and said rib with the radial inward projection of said rib from the wall of said bore being only a small fractional part of the wall thickness of said tube and in the order of .008" to .013", said radial projection of said rib being in an amount, however, to be at least slightly in excess of any clearance that might otherwise exist between the outer surface of said tube and the inner surface of said bore as a result of manufacturing tolerances to always provide localized superficial deformation of the outer surface of said tube in the plane of said rib but said deformation being of an order providing no appreciable retention of the hose against axial separation from the fitting, said nipple and sleeve at a point axially spaced from said radial wall portion having an annular sealing connection with each other, a socket embracing said sleeve and nipple and gripping said expanded reinforcement upon said outer surface of said sleeve, an assembly connection between said socket and nipple to attach said reinforcement to said nipple with that portion of said inner tube inserted within the bore of said sleeve functioning as a fluid pressure actuated sealing lip against the inner cylindrical surface of said sleeve bore, the deformation of the outer surface of said tube providing localized conditions in said plane sufficiently to initiate self-energization of said sealing lip by fluid pressure between said tube and nipple within said cavity and adjacent said plane, whereby a reduction in flexibility, stiffness, loss of compression due to flow and other structural characteristics either inherent in the said material of said tube in the green state or resulting from aging in service do not produce leakage at said sealing lip.

2. The combination set forth in claim 1 wherein there are two ribs axially spaced along said cylindrical portion of said bore and disposed within said cavity.

3. The combination of claim 1 wherein said rib in axial cross-sectional form has an abrupt shoulder on the side most adjacent said radial wall portion.

4. The combination of claim 1 wherein said sleeve and nipple are of metal and separately formed and said annular sealing connection therebetween is in the form of a metal-to-metal seal.

5. The combination of claim 1 wherein said tube material is polymerized tetrafluoroethylene.

References Cited in the file of this patent

UNITED STATES PATENTS

| | | |
|---|---|---|
| 1,944,890 | Heidloff | Jan. 30, 1934 |
| 2,146,756 | Miller | Feb. 14, 1939 |
| 2,428,189 | Wolfram | Sept. 30, 1947 |
| 2,463,293 | Mentel | Mar. 1, 1949 |
| 2,567,773 | Krupp | Sept. 11, 1951 |
| 2,685,458 | Shaw | Aug. 3, 1954 |
| 2,731,279 | Main | Jan. 17, 1956 |

FOREIGN PATENTS

| | | |
|---|---|---|
| 151,318 | Australia | May 7, 1953 |
| 1,048,083 | France | July 28, 1953 |
| 1,075,106 | France | Apr. 14, 1954 |
| 1,079,360 | France | May 19, 1954 |